US011186745B2

(12) United States Patent
Moon et al.

(10) Patent No.: US 11,186,745 B2
(45) Date of Patent: Nov. 30, 2021

(54) COATING COMPOSITION FOR GOLF BALLS

(71) Applicant: NEXEN CORPORATION, Gyeongsangnam-do (KR)

(72) Inventors: Jung Gyu Moon, Seoul (KR); Yong Woo Shin, Gyeongsangnam-do (KR)

(73) Assignee: NEXEN CORPORATION, Gyeongsangnam-do (KR)

( * ) Notice: Subject to any disclaimer, the term of this patent is extended or adjusted under 35 U.S.C. 154(b) by 180 days.

(21) Appl. No.: 16/603,009

(22) PCT Filed: Jul. 18, 2019

(86) PCT No.: PCT/KR2019/008874
§ 371 (c)(1),
(2) Date: Oct. 4, 2019

(87) PCT Pub. No.: WO2020/241962
PCT Pub. Date: Dec. 3, 2020

(65) Prior Publication Data
US 2020/0377754 A1    Dec. 3, 2020

(51) Int. Cl.
*C09D 167/08* (2006.01)
*C09D 5/03* (2006.01)
(Continued)

(52) U.S. Cl.
CPC ........ *C09D 167/08* (2013.01); *A63B 37/0022* (2013.01); *C08G 18/73* (2013.01);
(Continued)

(58) Field of Classification Search
CPC .... C09D 167/08; C09D 5/032; A63B 37/022; C08G 18/73; C08K 3/36; C08K 5/0025; C08K 5/17; C08K 5/3475
See application file for complete search history.

(56) References Cited

U.S. PATENT DOCUMENTS

| 2002/0013404 A1 | 1/2002 | Buter et al. |
| 2006/0089419 A1* | 4/2006 | Hogge ................ C09D 175/16 522/174 |

(Continued)

FOREIGN PATENT DOCUMENTS

| CN | 104725618 | * | 6/2015 | ............ C08G 63/52 |
| JP | 2016513488 A | | 5/2016 | |

(Continued)

OTHER PUBLICATIONS

English machine translation of CN 104725618. (Year: 2015).*

(Continued)

*Primary Examiner* — John E Uselding
(74) *Attorney, Agent, or Firm* — Hoffmann and Baron, LLP

(57) ABSTRACT

The present invention relates to a coating composition for covering golf balls. More particularly, the present invention relates to a matte coating composition mixed with a synthetic fatty acid resin derived from dehydrated castor oil. According to the present invention, a golf ball having a matte surface can realize a uniform and fine matte appearance and ensure a field of vision to enable high-precision hitting, faithfully express desired marks of various colors, characters and patterns applied thereto, and prevent surface yellowing caused by exposure to ultraviolet rays over a long period of time.

2 Claims, 2 Drawing Sheets

(51) Int. Cl.
    *C08K 3/36*     (2006.01)
    *C08K 5/3475*     (2006.01)
    *C08K 5/00*     (2006.01)
    *C08G 18/73*     (2006.01)
    *A63B 37/00*     (2006.01)
    *C08K 5/17*     (2006.01)

(52) U.S. Cl.
    CPC .............. *C08K 3/36* (2013.01); *C08K 5/0025* (2013.01); *C08K 5/17* (2013.01); *C08K 5/3475* (2013.01); *C09D 5/032* (2013.01); *C08K 2201/003* (2013.01)

(56) References Cited

U.S. PATENT DOCUMENTS

2014/0194565 A1     7/2014   Harada
2018/0093137 A1*   4/2018   Park ................... C08G 18/4252

FOREIGN PATENT DOCUMENTS

| KR | 1020050070808 A | 7/2005 |
| KR | 1020110078410 A | 7/2011 |
| KR | 1020170087848 A | 7/2017 |

OTHER PUBLICATIONS

Patent Cooperation Treaty International Search Report for International Application No. PCT/KR2019/008874, dated Feb. 27, 2020.
Korean Patent Office Action issued in Korean Patent Application No. 10-2019-0063683 Filed May 30, 2019 and dated Sep. 1, 2020, and translation thereof.

* cited by examiner

[FIG. 1]
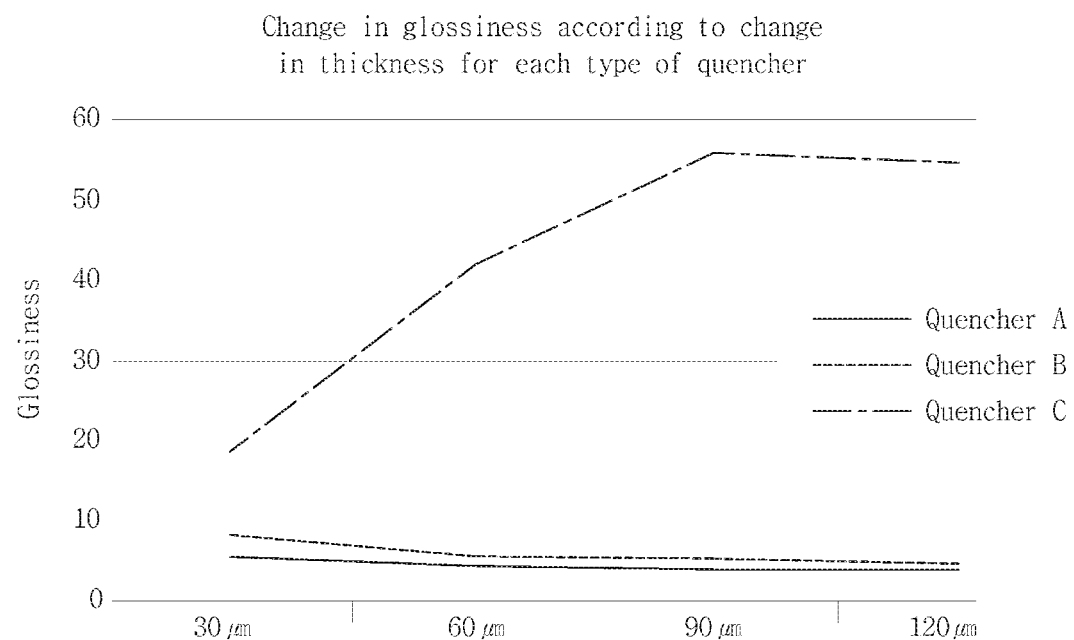

[FIG. 2]
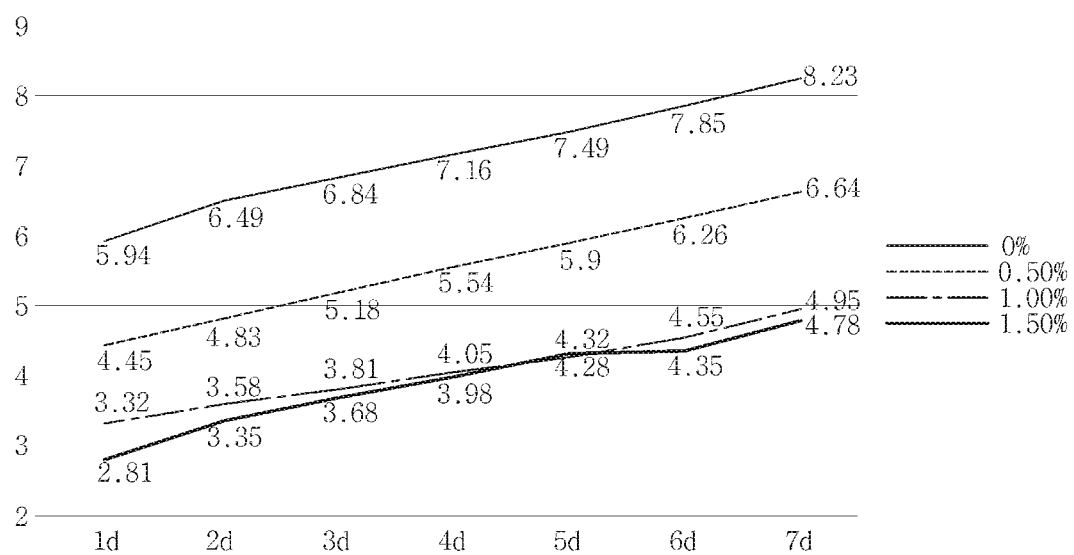

COATING COMPOSITION FOR GOLF BALLS

PRIORITY CLAIM

The present application is a 371 application of PCT International Application No. PCT/KR2019/008874 filed on Jul. 18, 2019; which claims priority to Korean application Serial No. KR 10-2019-0063683 filed on May 30, 2019, the disclosures of each of the aforementioned applications are incorporated by referenced herein in their entirety.

TECHNICAL FIELD

The present invention relates to a coating composition for covering golf balls. More particularly, the present invention relates to a matte coating composition mixed with a synthetic fatty acid resin derived from dehydrated castor oil.

BACKGROUND ART

In general, a golf ball said to have excellent performance means a ball that helps to ensure an excellent driving distance and which has an excellent spin rate, thus enabling excellent iron shot control.

Meanwhile, in addition to the above-described performance of the golf ball, an additional important factor is to accurately predict the driving distance and landing point when hitting the golf ball and also predict accurate line analysis and progress direction when putting. In order to achieve this, it is required that players concentrate very hard when hitting or putting the golf ball.

Golf balls that are generally used include a coating layer having high glossiness (i.e., a glossy coating) on the surface thereof in consideration of the driving distance. However, a golf ball including such a glossy coating may reflect light to a player under sunlight, which hinders the player's concentration. It may also make it difficult to accurately hit the golf ball.

Further, the glossy coating causes a yellowing phenomenon when the surface of the ball is exposed to ultraviolet rays over a long period of time upon the use of the ball over a long period of time, and the yellowing phenomenon has a bad effect on the aesthetic appearance thereof.

In consideration of the problems with the glossy coating composition, currently, there is increasing demand for a coating composition for golf balls, which reduces the gloss of the surface and prevents a yellowing phenomenon without deteriorating the performance or physical properties of the golf balls.

SUMMARY

Technical Problem

Accordingly, the present invention has been made keeping in mind the above problems occurring in the prior art, and an object of the present invention is to provide a coating composition which reduces the surface gloss of golf balls and prevents a yellowing phenomenon without deteriorating physical properties.

Technical Solution

In order to accomplish the above object, the present invention provides a coating composition for golf balls, which includes a main substance and a curing agent. The main substance includes a synthetic fatty acid resin derived from dehydrated castor oil, a UV stabilizer, a storage stabilizer, and silica. The curing agent includes a hexamethylene diisocyanate resin.

In the matte coating composition for golf balls according to the present invention, preferably, the synthetic fatty acid resin derived from dehydrated castor oil is a resin manufactured using dehydration polymerization of the fatty acid having the following structure.

[Structural Formula 1]

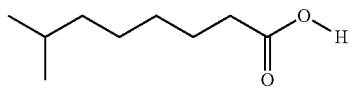

According to an embodiment of the present invention, preferably, the UV stabilizer includes a benzotriazole-based UV absorbent and a hindered amine-based light stabilizer. Preferably, the storage stabilizer includes a polyamide-based stabilizer, and a curing stabilizer includes a hexamethylene diisocyanate resin.

According to the embodiment of the present invention, preferably, the silica includes a powder form having an average particle diameter of 1 to 2 μm, and the content thereof is 3 to 15 parts by weight based on 100 parts by weight of the total content of the main substance.

According to the embodiment of the present invention, preferably, the content of the synthetic fatty acid resin is 25 to 50 parts by weight based on 100 parts by weight of the total content of the main substance.

According to the embodiment of the present invention, preferably, the synthetic fatty acid resin has a weight average molecular weight of 3,000 to 10,000 g/mol and a hydroxy content (OH %) of 3.0% to 5.0%.

According to the embodiment of the present invention, preferably, the curing agent has an isocyanate content of 10 to 22 wt %. Further, preferably, the content of the hexamethylene diisocyanate resin is 50 to 70 parts by weight based on 100 parts by weight of the total content of the curing agent.

According to the embodiment of the present invention, preferably, the content of the UV stabilizer is 1 to 3 parts by weight based on 100 parts by weight of the total content of the main substance. Further, preferably, the content of the storage stabilizer is 0.1 to 1.0 parts by weight based on 100 parts by weight of the total content of the main substance.

According to the embodiment of the present invention, preferably, the ratio of the main substance to the curing agent is 4:1 to 2:1.

Advantageous Effects

A golf ball having a matte surface as an advantage of the present invention can realize a uniform and fine matte appearance and ensure a field of vision to enable high-precision hitting, faithfully express desired marks of various colors, characters and patterns applied thereto, and prevent surface yellowing caused by exposure to ultraviolet rays over a long period of time.

DESCRIPTION OF DRAWINGS

FIG. 1 is a graph showing the change in glossiness depending on the type and thickness of a quencher; and FIG. 2 is a graph showing yellowing with the passage of time depending on the ratio of a UV stabilizer in a coating composition.

DETAILED DESCRIPTION

Hereinafter, the present invention will be described in more detail.

Golf balls are classified into several types depending on the structure and color thereof. Golf balls are gradually being developed to have various structures and shapes, such as a 2-piece golf ball having a two-layered structure including a core and a cover surrounding the core, a 3-piece golf ball having a three-layered structure including a core, an external layer surrounding the core, and a cover positioned on the external layer, a 4-piece golf ball including a core and third and fourth layers surrounding the core, a 5-piece golf ball, and a colored golf ball including a cover coated with various colors.

In the present invention, particularly, a matte coating composition for surfaces is provided to golf balls having any of the above-described structures. Accordingly, precise hitting is ensured, thus improving athletic performance, and also yellowing of the surface thereof by ultraviolet rays is prevented, thus improving the appearance of the golf ball.

To this end, a matte coating composition for golf balls according to the present invention includes a main substance and a curing agent. The main substance includes a synthetic fatty acid resin derived from dehydrated castor oil, a UV stabilizer, a storage stabilizer, and silica. The curing agent includes a hexamethylene diisocyanate resin. Preferably, the synthetic fatty acid resin derived from dehydrated castor oil is a resin manufactured using dehydration polymerization of the fatty acid having the following structure.

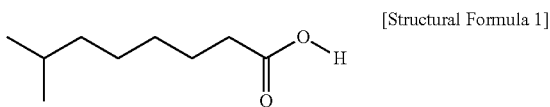

[Structural Formula 1]

The synthetic fatty acid may be manufactured according to a substitution reaction of ethylene at a high temperature in the presence of a catalyst using dehydrated castor oil as a starting material.

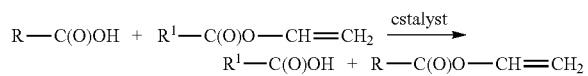

Through the substitution reaction described above, a carbon chain of 9 carbon atoms ($R^1$) may be bonded to dehydrated castor oil to manufacture the compound of [Structural Formula 1] ($R^1$—C(O)OH).

Meanwhile, a synthetic fatty acid resin having the following structure may be obtained using dehydration polymerization of the synthetic fatty acid.

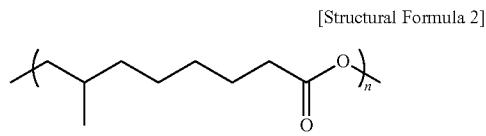

[Structural Formula 2]

According to an embodiment of the present invention, preferably, the synthetic fatty acid resin has a weight average molecular weight of 3,000 to 10,000 g/mol and a hydroxy content (OH %) of 3.0% to 5.0%.

Preferably, the content of the synthetic fatty acid resin is 25 to 50 parts by weight based on 100 parts by weight of the total content of the main substance.

In the present invention, since the synthetic fatty acid resin does not include an aromatic ring in a main chain, it is possible to prevent a yellowing phenomenon due to UV when the synthetic fatty acid resin is used as the main component of the coating composition. A conventional polyurethane resin is manufactured using aromatic isocyanates, and yellowing is frequently caused by ultraviolet rays of sunlight. In other words, ultraviolet energy with a wavelength range of 290 to 400 nm breaks the chemical double bond of polymers, especially the chemical double bond of aromatic rings of aromatic isocyanates, thus generating free radicals that cause chain cleavage and cross-linking, resulting in discoloration due to chromophores. Moreover, there are problems such as discoloration, deterioration of gloss or transparency, occurrence of a whitening phenomenon, cracking of products, and deterioration of mechanical properties due to the oxidation caused by ultraviolet rays. Therefore, the resin that does not include an aromatic ring in the main chain thereof according to the present invention has an advantage of not causing problems such as discoloration due to ultraviolet rays.

In addition, the synthetic fatty acid resin of the present invention has an additional advantage in that the toughness of the material is high and the force of adhesion to a resin to be coated is strong when a coating film is formed, compared to other resins.

Meanwhile, in the matte coating composition of the present invention, preferably, the UV stabilizer includes a benzotriazole-based UV absorbent and a hindered amine-based light stabilizer, the storage stabilizer includes a polyamide-based stabilizer, and a curing stabilizer includes a hexamethylene diisocyanate resin.

The UV stabilizer is used to prevent dissociation between the elements constituting the resin caused by ultraviolet rays. The light energy in the wavelength range of ultraviolet rays is 71 to 100 Kcal/mol, and the degradation caused by ultraviolet rays is an oxidation reaction occurring in the presence of oxygen. The UV stabilizer for preventing photooxidation is a compound that blocks the penetration of ultraviolet rays to thus delay the oxidation of the resin due to ultraviolet rays. As the UV stabilizer, UV absorbents and sunscreens may be used. Preferably, a benzotriazole-based UV absorbent and a hindered amine-based light stabilizer may be used. The hindered amine-based light stabilizer is particularly preferable because it is suitable for a polymer resin and is capable of providing the effect of thermal stabilization.

The storage stabilizer serves to inhibit a chemical reaction between the components in the main substance before the main substance and the curing agent are mixed, thus improving storage property. The storage stabilizer preferably includes a polyamide-based stabilizer.

The curing stabilizer serves to prevent the resin composition from being transformed or deformed during a curing process, and preferably includes a methylene diisocyanate resin.

According to the embodiment of the present invention, preferably, the content of the UV stabilizer is 1 to 3 parts by weight based on 100 parts by weight of the total content of the main substance. Further, preferably, the content of the storage stabilizer is 0.1 to 1.0 parts by weight based on 100 parts by weight of the total content of the main substance.

The matte coating composition for golf balls of the present invention includes inorganic particles as a quencher in the main substance. Accordingly, reflections from the coating are suppressed and thereby glossiness is reduced. Preferably, the inorganic particles include powder-type silica having an average particle diameter of 1 to 2 μm.

Preferably, the content of silica is 3 to 15 parts by weight based on 100 parts by weight of the total content of the main substance.

In the present specification, the average particle diameter refers to a cumulative average particle diameter (D50) corresponding to 50 vol % in a paraticle-size-cumulative-distribution curve with 100% of the total volume. The average particle diameter D50 may be measured using a method well known to those skilled in the art, for example, using a particle size analyzer or using a TEM (transmission electron microscope) photograph or a SEM (scanning electron microscope) photograph. In an example of another method, after measurement is performed using a measuring device using a dynamic light-scattering method, data analysis and counting of particles for each size range are performed, and the average particle diameter D50 may be easily obtained through calculation therefrom.

The inorganic particles may include, in addition to the silica particles, at least one selected from among oxides of metals and semimetals, such as $Al_2O_3$, $AlPO_4$, $MgO$, $TiO_2$, $ZrO_2$, and $Fe_2O_3$; inorganic oxides of natural minerals such as montmorillonite, attapulgite, bentonite, palygorskite, smectite, humite, diatomite, white clay, silica sand, limestone, kaolin, clay, talc, agalmatolite, perlite, sodium silicate, sodium aluminum silicate, magnesium aluminum silicate, silica hydrogel, synthetic (fumed) silica, wet (precipitated) silica, alumina zeolite, molecular sieve, reverse-phase silica, and processed and activated mineral systems; organic-based particles such as low-molecular polyethylene fine particles and medium-molecular polyethylene fine particles; and aluminum stearate.

Meanwhile, preferably, a hexamethylene diisocyanate resin is included as the curing agent included in addition to the main substance. Preferably, the content of the hexamethylene diisocyanate resin is 50 to 70 parts by weight based on 100 parts by weight of the total content of the curing agent. In addition, the isocyanate content in the curing agent is preferably 10 to 22 wt %.

According to the embodiment of the present invention, preferably, the ratio of the main substance to the curing agent is 4:1 to 2:1.

Meanwhile, the matte coating composition of the present invention may preferably include additional additives within the range that does not impair the effects of the invention. Examples of the usable additives may include blow-molding and blowing agents, a fluorescent whitening agent, a dye, a fluorescent agent, a whitening agent, an antifoaming agent, a processing aid, a nanofiller, an antioxidant, a stabilizer, a softening agent, an aromatic component, a plasticizer, an anti-impact modifier, an acid copolymer wax, and a surfactant, but are not limited thereto. Further, specific examples of the filler include a high-ratio powder or metal oxide filler, an inorganic filler, a nano-filler, and recycled materials of ground golf balls, but are not limited thereto.

MODE FOR INVENTION

Hereinafter, preferred Examples and Comparative Examples of the present invention will be described. The following Examples are intended to illustrate the present invention and should not be understood as limiting the scope of the present invention.

EXAMPLE

Synthetic fatty acid (isononanoic acid) (Structural Formula 1) having 9 carbon atoms derived from dehydrated castor oil, phthalic anhydride, difunctional alcohol, trifunctional alcohol, and a tin (Sn) reaction catalyst were added to a flask. The mixture was heated to 160° C. and maintained for 1 hour while nitrogen gas was injected. Dehydration started and the reaction proceeded. Subsequently, the temperature was increased to 230° C. over 3 to 4 hours to facilitate the dehydration reaction. When the top temperature of a water-outlet condenser reached 90° C. or lower, a xylene solvent was added to facilitate a reflux reaction. While maintaining the reflux reaction, when an acid value (solid) became 10 or less, the reaction was terminated, followed by cooling. After cooling, a dilution solvent was added at 150° C. or lower, followed by stirring (in compliance with the required viscosity and the required standard range of nonvolatile matter).

Test Example 1

Coating compositions each containing 10% of the three types of quenchers A, B, and C in the synthetic fatty acid resin obtained in the above Example were manufactured to measure the change in glossiness for each thickness.

TABLE 1

| Thickness | Quencher A | Quencher B | Quencher C |
|---|---|---|---|
| 30 μm | 5.5 | 8.2 | 18.7 |
| 60 μm | 4.3 | 5.6 | 41.9 |
| 90 μm | 3.9 | 5.1 | 55.9 |
| 120 μm | 3.8 | 4.6 | 54.7 |

Quenchers A and B included 100% of silica ($SiO_2$) of different grades, and quencher C included 80 wt % of silica and 20 wt % of microcrystalline wax (CAS No. 63231-60-7) mixed with each other. It was confirmed that the cases of 100% silica (quenchers A and B) had an excellent quenching effect even at a low content of the quenchers and that optical deviation depending on the thickness of a coating film thickness was not large.

The glossiness was measured at room temperature/atmospheric pressure (25° C./1 atm) using a BYK-Gardner Micro-Tri-Gloss Meter, and light radiation was incident at an angle of 60°.

Meanwhile, the yellowing property was measured while changing the ratio of the UV stabilizer in the coating composition including the synthetic fatty acid resin according to the present invention. TINUVIN (benzotriazole-based) was used as the UV stabilizer.

TABLE 2

|  | 1 d | 2 d | 3 d | 4 d | 5 d | 6 d | 7 d |
|---|---|---|---|---|---|---|---|
| 0 | 5.94 | 6.49 | 6.84 | 7.16 | 7.49 | 7.85 | 8.23 |
| 0.50 | 4.45 | 4.83 | 5.18 | 5.54 | 5.90 | 6.26 | 6.64 |
| 1.00 | 3.32 | 3.58 | 3.81 | 4.05 | 4.28 | 4.55 | 4.95 |
| 1.50 | 2.81 | 3.35 | 3.68 | 3.98 | 4.32 | 4.35 | 4.78 |

The UV stabilizer is TINUVIN 400, and is 2-[4-[2-hydroxy-3-tridecyloxypropyl]oxy]-2-hydroxyphenyl]-4,6- bis(2,4-dimethylphenyl)-1,3,5-triazine or 2-[4-[2-hydroxy-3-didecyloxypropyl]oxy]-2-hydroxyphenyl]-4,6-bis(2,4-dimethylphenyl)-1,3,5-triazine.

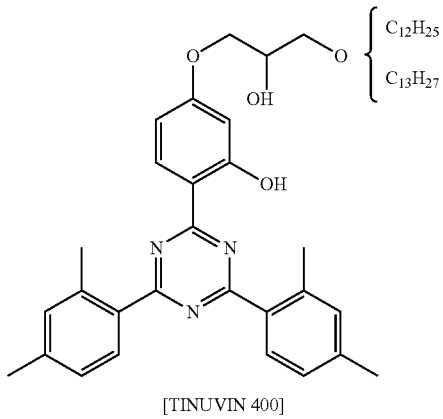

[TINUVIN 400]

It was confirmed that the anti-yellowing effect was increased as the content of the UV stabilizer was increased and that the effect on the content was not large when the content thereof was 1.0 wt % to 1.5 wt % or more based on the total weight of the main substance.

The color difference value was measured at room temperature/atmospheric pressure (25° C./1 atm) using a [Multi-Angle Spectrophotometer MA94] manufactured by X-Rite company. The US radiation light was measured at a period of hours using radiation light at 313 nm (1 d and 2 d represent the days). With respect to a ΔE*ab value measured after the laps of a corresponding amount of time, deviations of L*, a*, and b* of specimens after the completion of light radiation thereon were comprehensively calculated using a value of L*t for measuring the white-black of a reference specimen, a a*t value for measuring the red-green thereof, and a b*t value for measuring the yellow-blue thereof.

The invention claimed is:

1. A golf ball comprising a coating film, wherein the coating film comprises a coating composition comprising:
  a main substance and a curing agent, wherein a weight ratio of the main substance to the curing agent is 4:1 to 2:1,
  wherein the main substance includes a synthetic fatty acid resin represented by Structural Formula 2, a UV stabilizer, a storage stabilizer, and a quencher,

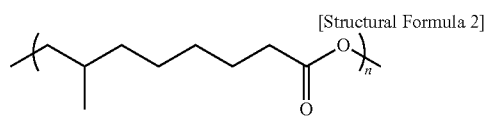

[Structural Formula 2]

wherein n is a number whereby the synthetic fatty acid resin has a weight average molecular weight of 3,000 to 10,000 g/mol and wherein the content of the synthetic fatty acid resin is 25 to 50 parts by weight based on 100 parts by weight of a total content of the main substance,
  wherein the UV stabilizer includes a benzotriazole-based UV absorbent and a hindered amine-based light stabilizer, wherein a content of the UV stabilizer is 1 to 3 parts by weight based on 100 parts by weight of the total content of the main substance and a content of the benzotriazole-based UV absorbent is 0.5 to 1 parts by weight based on 100 parts by weight of the total content of the main substance,
  wherein the storage stabilizer includes a polyamide-based stabilizer, wherein a content of the storage stabilizer is 0.1 to 1.0 parts by weight based on 100 parts by weight of the total content of the main substance,
  wherein the curing agent includes a hexamethylene diisocyanate resin, wherein a content of the hexamethylene diisocyanate resin is 50 to 70 parts by weight based on 100 parts by weight of a total content of the curing agent,
  wherein a content of the quencher is 10 parts by weight based on 100 parts by weight of the total content of the main substance and the quencher consists of a 100% silica including a powder form having an average particle diameter of 1 to 2 μm, and
  wherein the coating film has a thickness in a range of 30 to 120 μm.

2. The golf ball of claim 1, wherein the curing agent has an isocyanate content of 10 to 22 mass %.

* * * * *